US010574629B2

(12) United States Patent
Valsecchi et al.

(10) Patent No.: US 10,574,629 B2
(45) Date of Patent: Feb. 25, 2020

(54) HEADER TRANSLATION MODIFICATION (71) Applicant: PIKSEL, INC., Wilmington, DE (US)

(72) Inventors: Stefano Valsecchi, Monza (IT); Giorgio Tornielli, Mortara (IT)

(73) Assignee: PIKSEL, INC., Wilmington, DE (US)

( * ) Notice: Subject to any disclaimer, the term of this patent is extended or adjusted under 35 U.S.C. 154(b) by 132 days.

(21) Appl. No.: 15/561,676

(22) PCT Filed: Mar. 24, 2016

(86) PCT No.: PCT/EP2016/056528
§ 371 (c)(1),
(2) Date: Sep. 26, 2017

(87) PCT Pub. No.: WO2016/156191
PCT Pub. Date: Oct. 6, 2016

(65) Prior Publication Data
US 2018/0083920 A1 Mar. 22, 2018

(30) Foreign Application Priority Data

Mar. 27, 2015 (GB) .................................. 1505330.9

(51) Int. Cl.
*H04L 29/06* (2006.01)
*G06F 21/10* (2013.01)

(52) U.S. Cl.
CPC ........ *H04L 63/0236* (2013.01); *G06F 21/105* (2013.01); *H04L 63/0442* (2013.01);
(Continued)

(58) Field of Classification Search
CPC . H04L 63/0236; H04L 63/168; H04L 63/062; H04L 63/0442; H04L 29/06; G06F 21/105; G06F 2221/0759; G06F 21/10
(Continued)

(56) References Cited

U.S. PATENT DOCUMENTS

2007/0038931 A1* 2/2007 Allaire ............... G06Q 30/0239
715/206
2008/0140433 A1* 6/2008 Levy ....................... G06F 21/10
705/26.1
(Continued)

FOREIGN PATENT DOCUMENTS

WO WO 2012011726 A2 1/2012

OTHER PUBLICATIONS

International Search Report and Written Opinion, dated Jun. 20, 2016, European Patent Office.
Report under Section 17(5)(b),Aug. 18, 2016, Intellectual Property Office, Great Britain.
Kaiser Stefan et al.: "DRM-interoperable MPEG-dash end-to-end architecture", 2013 IEEE International Conference on Multipmedia and Expo (ICME), IEEE, Jul. 14, 2014, pp. 1-2.
(Continued)

*Primary Examiner* — Ashokkumar B Patel
*Assistant Examiner* — Quazi Farooqui
(74) *Attorney, Agent, or Firm* — Holzer Patel Drennan (57) ABSTRACT

There is disclosed a video player comprising a Widevine decoder, further comprising: a receiver for receiving an asset and an associated manifest file; a search engine for searching the manifest file to identify a KeyID field; a Widevine header creation module for creating a Widevine header including: a KeyID field corresponding to the identified KeyID field of the asset manifest file; and a ContentID field based on the identified KeyID field of the asset manifest file, wherein the format of the KeyID field and the created ContentID field of the created Widevine header are different; an interface for transmitting a request for a license to a Widevine license server, the request including the created Widevine header, and for receiving a Widevine license from the Widevine license server responsive to the request; and a controller for accessing video content associated with the asset using the Widevine license. There is disclosed a Widevine license server configured to: receive a license request including a Widevine header from a video player; transmit the Widevine header to a Widevine processing function; receive the Con-
(Continued)

tentID field of the Widevine header from the Widevine processing function; parse the ContentID field, and in dependence on identification of the syntax of said field, using the KeyID field to obtain a Widevine license; and transmit the accessed Widevine license to the video player.

13 Claims, 5 Drawing Sheets

(52) U.S. Cl.
CPC .......... *H04L 63/062* (2013.01); *H04L 63/168* (2013.01); *G06F 2221/0759* (2013.01)

(58) Field of Classification Search
USPC .................. 713/154, 150, 165, 167; 380/200
See application file for complete search history.

(56) References Cited

U.S. PATENT DOCUMENTS

| 2010/0185854 | A1 | 7/2010 | Burns et al. |
| 2011/0072495 | A1* | 3/2011 | Chu .................. H04N 21/4181 726/4 |
| 2012/0291142 | A1* | 11/2012 | Seleznev ................. G06F 21/10 726/30 |
| 2014/0075582 | A1* | 3/2014 | Hierro .................. H04L 63/123 726/30 |
| 2015/0013014 | A1 | 1/2015 | Daniel et al. |

OTHER PUBLICATIONS

Examination Report for European Patent Application 16713367.7, dated Mar. 4, 2019.

* cited by examiner

HEADER TRANSLATION MODIFICATION

BACKGROUND TO THE INVENTION

Field of the Invention

The invention relates to the decrypting of an asset having content protection associated therewith.

Description of the Related Art

The common encryption (CENC) protection scheme specifies standard encryption and key mapping methods that can be utilized by one or more digital-rights management (DRM) systems to enable decryption of an asset, such as a video file, using different DRM systems such as PlayReady, Marlin, Widevine or other encryption protocols supporting the CENC scheme.

The scheme operates by defining a common format for the encryption-related metadata necessary to decrypt the protected streams, yet leaves the details of rights mappings, key acquisition and storage, DRM compliance rules, etc., up to the specific DRM system or systems supporting the CENC scheme.

The CENC standard specifies three core elements:
1. The encryption algorithm used.
In particular CENC requires the use of the Advanced Encryption Standard, Federal Information Processing Standards Publication 197, FIPS-197 published by the United States National Institute of Standards and Technology (NIST) using 128-bit keys in Counter Mode (AES-CTR), as specified in "Recommendation of Block Cipher Modes of Operation", NIST, NIST Special Publication 800-38A.
2. How to signal in the asset file that the file itself is encrypted.
3. Where to store the encryption related metadata necessary to decrypt the protected asset file.
More precisely, the encryption related metadata necessary to decrypt the protected files or streams consists in turn of at least the following elements:
1. Protection System Specific Data.
This data is opaque to the CENC Common Encryption Scheme. This gives protection systems a place to store their own data using a common mechanism. This data is contained in the Protection System Specific Header (PSSH) Box.
2. Common encryption information for a media track, group of samples or individual samples.
These include default values for the key identifier (KeyID), initialization vector size, and encryption flag.

An asset encrypted according to the CENC scheme may contain more than one PSSH header, e.g. one for each DRM system that is planned to be used for decrypting the asset. For instance, when the asset is encrypted, it is possible to include a PSSH header for PlayReady and a PSSH header for Widevine: in this way the same asset can be equally decrypted when it is received either by a PlayReady or by a Widevine DRM system.

This flexibility can be, for instance, exploited by a video player running in a client device such as a tablet, a laptop or a SmartTV for deciding at the time of decryption which DRM system to use based on criteria such as availability of DRM systems on the specific client device (e.g., a client device could support only a well-defined DRM system such as PlayReady) or, in the case more than one DRM system is available, on DRM costs (e.g., one DRM system being cheaper than another DRM system).

A video player must send a license request to a license server which includes information about which video the license request refers to. In a CENC enabled DRM system, the PSSH header is the data structure that is included in the license request and that will be used by the license server to extract the information it requires to process the request.

There are two different identifiers that are normally used to identify a video:
1. KeyID
This is the public part of encryption secrets used to encrypt the video (in the AES—advanced encryption standard—algorithm the encryption key is also used to decrypt the video).
2. ContentID
This is the identifier that uniquely identifies a video asset.
The two may differ, for instance, in the case different segments of the same video asset have been encrypted using different encryptions keys.

Different DRM systems use either one or the other or both to extract from an encryption keys store a secret part of an encryption key that is then included in the DRM license that is eventually sent back to the video player.

For instance, PlayReady uses the KeyID value to extract from the key store the secret part of an encryption key. Widevine uses the ContentID for the same purpose.

The PSSH header for different DRM technologies only include the piece of information they need. Thus a PlayReady PSSH header contains the KeyID but not the ContentID, and a Widevine PSSH header contains both the KeyID and the ContentID.

The majority of current services are based on Smooth-Streaming with PlayReady content protection (HSS/PR).

However some browsers, such as chrome, do not provide support for PlayReady. At present, Chrome only supports assets which are in the MPEG-DASH format protected with Widevine (according to the common encryption scheme). However existing OTT (over-the-top) content services have a large catalogue of on-demand assets based on Smooth-Streaming with PlayReady content protection.

In some situations it may happen that the encrypted video received in a video player contains PSSH headers for DRM systems that are not supported in the client device. For instance, it may contain the PSSH header for PlayReady but not for Widevine whilst the client device only supports Widevine. In this case, a basic implementation of a video player will not play the video because the client device does not have the necessary information required to engage the correct DRM system.

One way to address this it to reuse the existing HSS/PR asset mechanisms to re-encode/re-encrypt all assets in the new format.

It is an aim of the invention to provide an improvement which addresses one or more of the above-stated problems without needing to re-encode or re-encrypt the asset into a new format.

SUMMARY OF THE INVENTION

There is provided a video player comprising a Widevine decoder, further comprising: a receiver for receiving an asset and an associated manifest file; a search engine for searching the manifest file to identify a KeyID field; a Widevine header creation module for creating a Widevine header including: a KeyID field corresponding to the identified KeyID field of the asset manifest file; and a ContentID field based on the identified KeyID field of the asset manifest file, wherein the format of the KeyID field and the created ContentID field of the created Widevine header are different; an interface for transmitting a request for a license to a Widevine license server, the request including the created Widevine header, and for receiving a Widevine license from the Widevine license server responsive to the request; and a controller for accessing video content associated with the asset using the Widevine license.

There is provided a Widevine license server configured to: receive a license request including a Widevine header from a video player; transmit the Widevine header to a Widevine processing function; receive the ContentID field of the Widevine header from the Widevine processing function; parse the ContentID field, and in dependence on identification of the syntax of said field, using the KeyID field to obtain a Widevine license; and transmit the accessed Widevine license to the video player.

There is provided a method of generating a Widevine license request in a video player, comprising: receiving an asset and an associated manifest file; searching the manifest file to identify a KeyID field; creating a Widevine header including: a KeyID field corresponding to the identified KeyID field of the asset manifest file; and a ContentID field based on the identified KeyID field of the asset manifest file, wherein the format of the KeyID field and the created ContentID field of the created Widevine header are different; transmitting a request for a license to a Widevine license server, the request including the created Widevine header, and for receiving a Widevine license from the Widevine license server responsive to the request; and accessing video content associated with the asset using the Widevine license.

There is provided a method of generating a Widevine license in a Widevine license server, comprising: receiving a license request including a Widevine header from a video player; transmitting the Widevine header to a Widevine processing function; receiving the ContentID field of the Widevine header from the Widevine processing function; parsing the ContentID field, and in dependence on identification of the syntax of said field, using the KeyID field to obtain a Widevine license; and transmitting the accessed Widevine license to the video player.

There is provided a client device comprising a content protection decoder according to a first standard, comprising: a receiver for receiving an asset and an associated manifest file, wherein the asset is associated with content protection according to a second standard, the first and the second standards being in accordance with a common standard but being different to each other; a search engine for identifying a parameter of the common standard associated with the received asset and included in accordance with the first standard; a creation module for creating a content protection for the asset in accordance with the second standard based on the parameter; an interface for transmitting a request for a license to a license server and identifying a content protection associated with the second standard, and for receiving a license in accordance with the second standard responsive to the request; and a controller for accessing the content associated with the asset using the license in accordance with a second standard.

There is provided a license server configured to: receive a license request in accordance with a standard from a client device; transmit the request to a processing function associated with the standard; receive a parameter associated with the standard from the processing function; parse the parameter, and in dependence on identification of the syntax of said parameter, using a different parameter to access a license; and transmit the accessed license in accordance with the first standard to the client device.

There is provided a method of generating a license request in a client device, comprising: receiving an asset and an associated manifest file, wherein the asset is associated with content protection according to a second standard, the first and the second standards being in accordance with a common standard but being different to each other; identifying a parameter of the common standard associated with the received asset and included in accordance with the first standard; creating a content protection for the asset in accordance with the second standard based on the parameter; transmitting a request for a license to a license server and identifying a content protection associated with the second standard, and for receiving a license in accordance with the second standard responsive to the request; and accessing the content associated with the asset using the license in accordance with a second standard.

There is provided a method of generating a license in a license server, comprising: receiving a license request in accordance with a standard from a client device; transmitting the request to a processing function associated with the standard; receiving a parameter associated with the standard from the processing function; parsing the parameter, and in dependence on identification of the syntax of said parameter, using a different parameter to access a license; and transmitting the accessed license in accordance with the first standard to the client device.

There is provided a video player implementation that goes beyond the prior limitation, and is able to play a video even if not all the information for content protection is readily available.

A video player is able to translate the assets on-the-fly, for example from HSS/PR to DASH/WV (CENC).

DESCRIPTION OF THE FIGURES

The invention is described by way of example with reference to the accompanying figures, in which.

DESCRIPTION OF THE PREFERRED EMBODIMENTS

In general, a video player is provided which generates on-the-fly, a header to be included in a license request, which header is based on information extracted from the information available in the video player associated with a receives video asset. The header generated in this way may be partially complete because not all the necessary information may be derived from the available information in the video player. When this happens, a license server is able to detect a request containing an incomplete header and operate accordingly.

Figure 1:
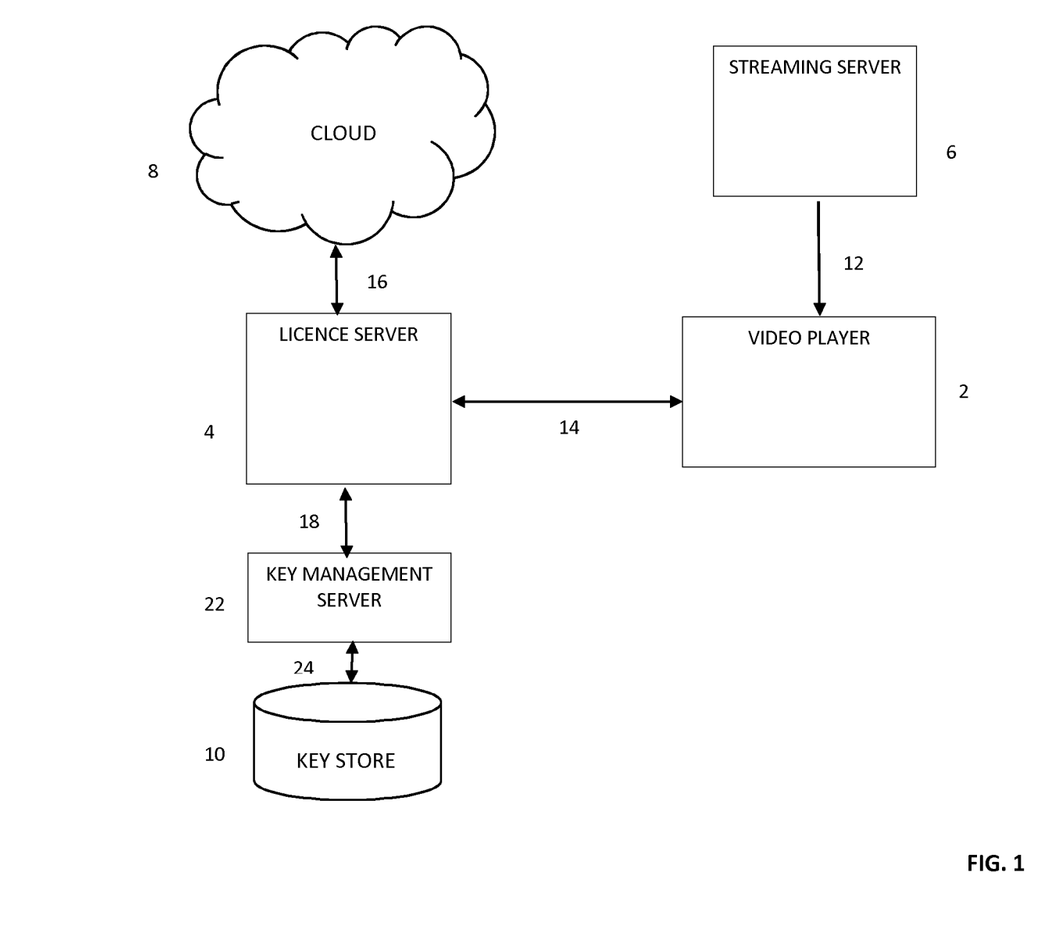
FIG. 1 illustrates an exemplary architecture in which examples may be implemented.

With reference to FIG. 1 there is illustrated an example architecture comprising a video player 2, a license server 4, a streaming server 6, a cloud 8, a key management server 22, and a key store 10. The streaming server 6 delivers assets comprising videos on a communication line 12 to the video player. In order to access the videos, the video player communicates on communication lines 4 with the license server 4 to obtain decryption information for decrypted video content. The license server 4 communicates on communications lines 16 with the cloud 8, and on communication lines 18 with the key management server 22. The key management server 22 communicated with the key store 10 on communication lines 24.

An example based around the example architecture of FIG. 1 is now described.

In this example the video player 2 is further illustrated with reference to FIG. 2, and includes: an encrypted media enhancement module 26 including an interface block for receiving asset and asset manifest data 32, a search engine 34, and a Widevine header creation block 36; a content decryption module for Widevine 28; and a content visualization module 30. The encrypted media enhancement module receives the signal on communication lines 12, and generates a Widevine license on line 38 and encrypted video on line 40 to the module 28. The module 28 delivers clean video on line 42 to the module 30. The module 26 generated signals on lines 14a of communication lines 14, and receives signals on line 14b of communication interface 14.

In this example, the license server 4 is a Widevine license server. Widevine is a digital rights management (DRM) standard. The Widevine license server 4 is further illustrated with reference to FIG. 3, and includes a parsing module 44. The signals received on line 14a on communication interface 14 are received by the parsing module 44 and also transferred to lines 16a for transmission to the cloud. Signals received from the cloud on line 16b are received by the parsing module 44. The parsing module 44 generates signals on line 18a to the key management server 22. Signals received from the key management server 22 on lines 18b are passed to the cloud on lines 16c. Signals received from the cloud on lines 16c are passed to the video player on lines 14b.

In this example, the streaming server 6 provides a video asset on communication lines 12 which is formatted in accordance with the MPEG-DASH (moving picture expert group-dynamic adaptive streaming over hypertext transfer protocol) video format. An an MPEG-DASH manifest for the video asset is also provided.

In accordance with this example, the video player generates on-the-fly a Widevine header to be included in a request to the Widevine license server 4, following receipt of a video asset which is not provided with Widevine content protection. The Widevine header in the request is based on information extracted from the available content protection information in the video player for the received video asset. The Widevine header generated in this way may be only partially complete because not all the necessary information may be available from the content protection information in the video player. When this happens, the Widevine license server is able to detect a request containing an incomplete Widevine header, and operate accordingly to provide for the video asset to be decrypted.

Figure 2:
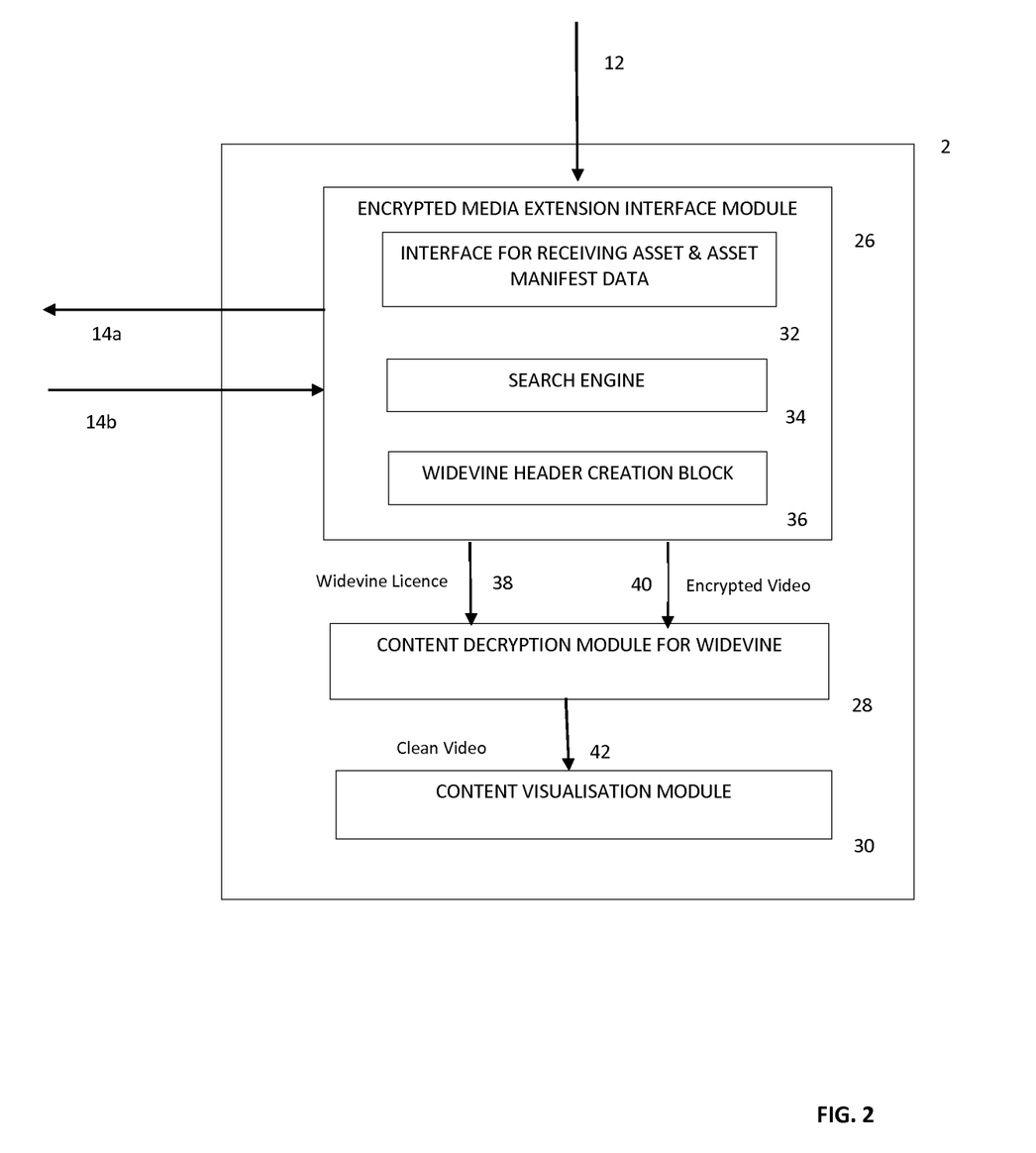
FIG. 2 illustrates an exemplary implementation of a video player in accordance with an example.

The video player 2 in this example runs in a browser implementing an encrypted media extension (EME) interface as illustrated by module 32 in FIG. 2, which may be an application program interface (API) that is part of the hypertext markup language version 5 (HTML5) standard, which is provided to manage encrypted content. This interface permits a query to be made to an underlying browser implementation for verifying which digital rights management (DRM) technology is supported. Standard APIs are available to determine on which browser the video player 2 is running. The provision of such an EME interface is known. In this example it is assumed that there is an encrypted media extension interface, but this example can be generalized to other contexts, such as native Android applications that do not use EME.

The manifest for an encrypted MPEG-DASH asset contains a content protection tag for each of the DRM technologies it supports. This content protection tag defines the DRM technologies with which the asset is encrypted. Optionally the manifest may also contain a generic content protection tag not associated with any specific DRM technology, but defining an encryption applied to the MPEG-DASH asset.

Each content protection tag may define any DRM technology used, and also may contain additional fields with respect to the identifier of the specific technology the tag refers to, such as the asset key field—known as the KeyID field—used for encrypting that asset. The KeyID field is the access key field associated with the content protection technology, and all content protection technology is provided with a KeyID field. The access key is used to retrieve an encryption key which is used to decrypt the encrypted content in the license server.

In this described example, the video player 2 is running in the Chrome browser. The Chrome browser only supports Widevine DRM technology. However the MPEG-DASH manifest does not include a content protection tag for Widevine. As such, the video player is not able to obtain the KeyID to access the encrypted key for decrypted the encrypted asset, as the Widevine decryption technology provided by the video player cannot decrypt the asset which is not encrypted with Widevine.

In this example, the video player 2 is adapted such that a Widevine header is generated for the asset, and the thus generated Widevine header is used to access the Widevine license server to allow the asset to be decrypted.

A Widevine header is required to include both a KeyID field and a ContentID field. Thus the generation of the Widevine header must take into account that a Widevine header must include these two mandatory fields: (i) the KeyID field which is the public part of the encryption secret; and (ii) the ContentID field which identifies the asset.

The Widevine header is generated starting from information available in the video player.

The essential information that the video player 2 needs in order to generate a Widevine header is the KeyID, and thus the KeyID is retrieved from the received asset manifest. The video player 2 is, in this example, adapted to search in a number of places to locate the KeyID.

Figure 4:
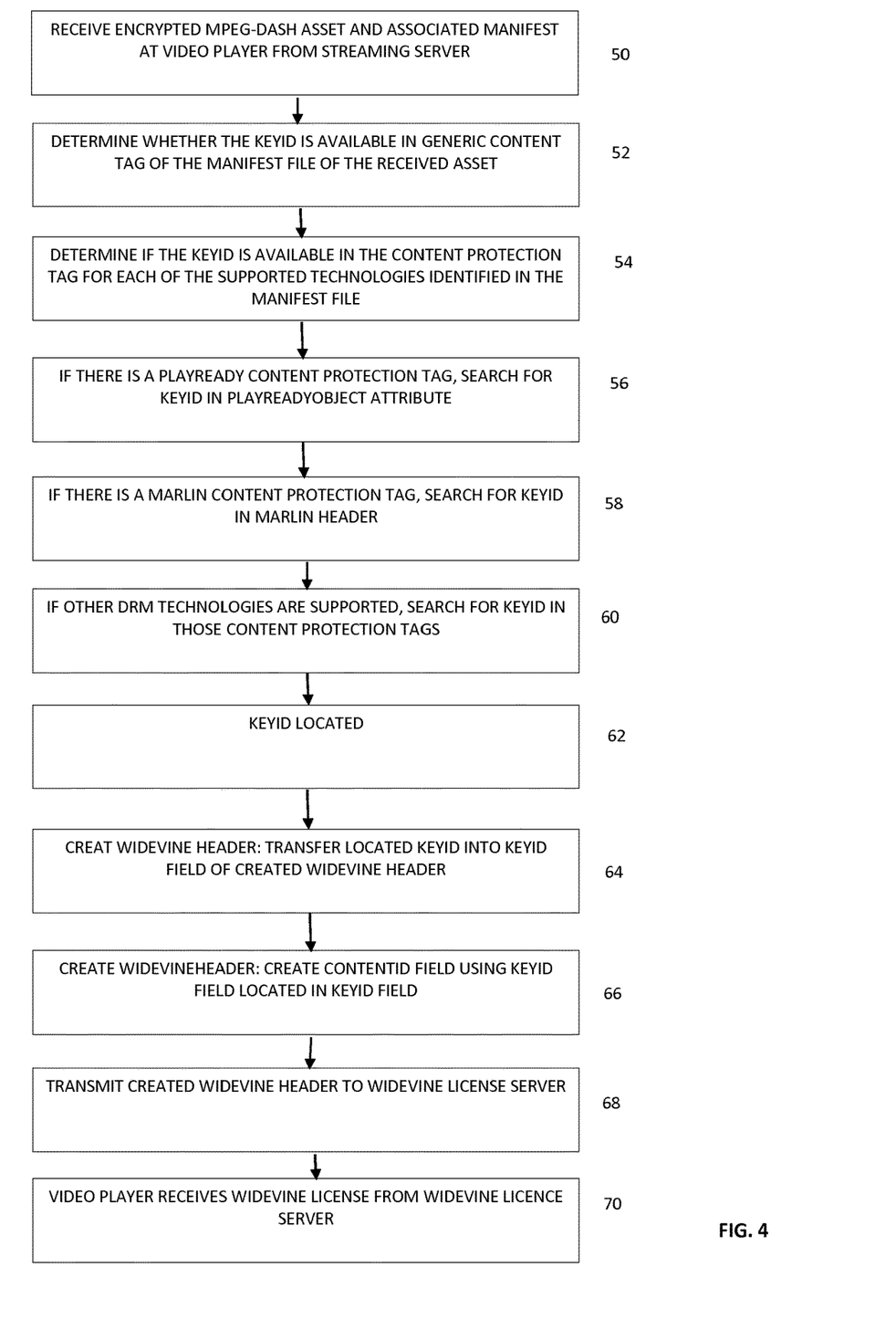
FIG. 4 illustrates an exemplary process in a video player in accordance with an example.
Figure 5:
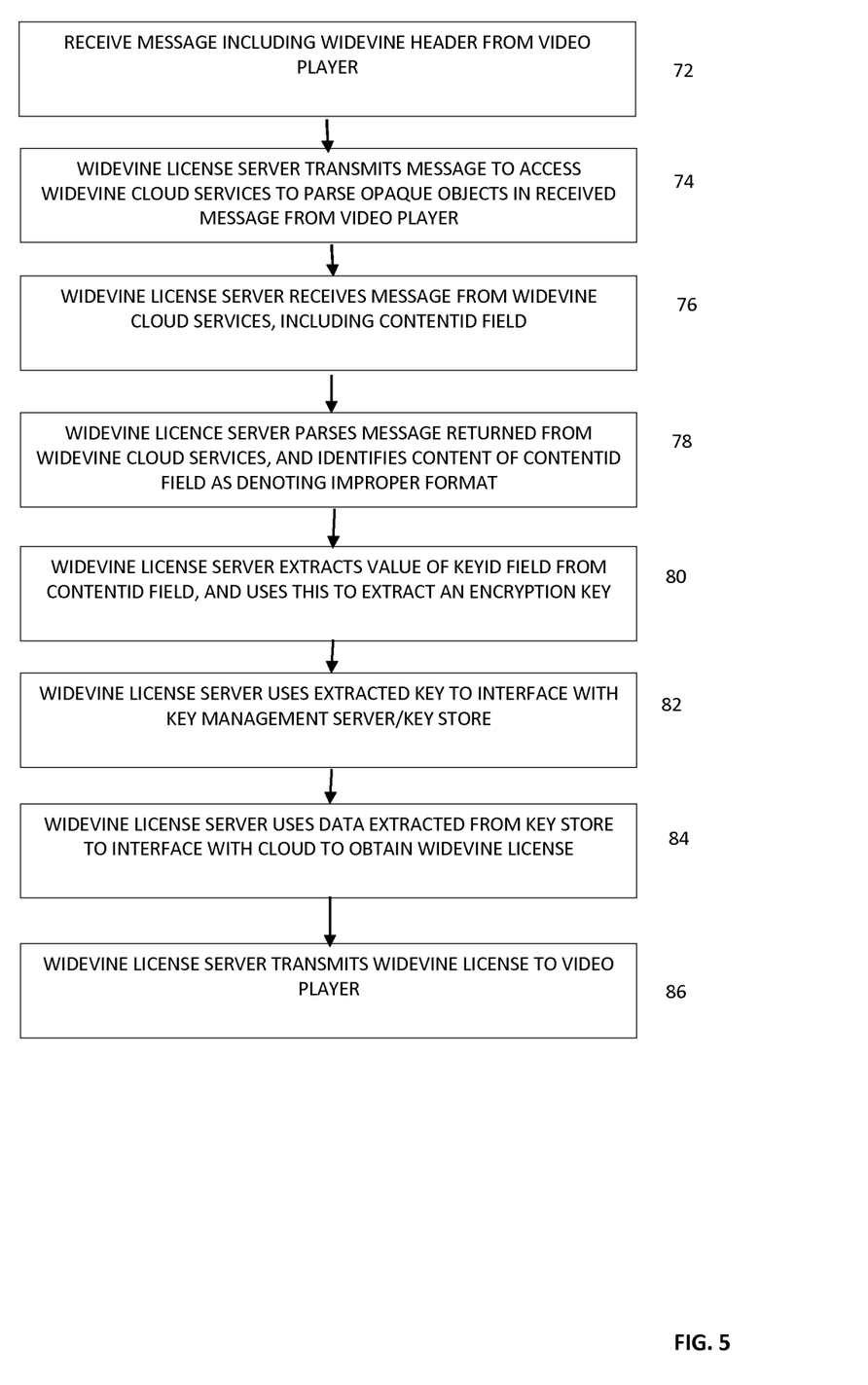
FIG. 5 illustrates an exemplary process in a license server in accordance with an example.

This example if described further with reference to the process flows of FIGS. 4 and 5, which illustrate the process steps carried out in the video player 2 and the Widevine license server 4 respectively.

In step 50 of FIG. 4 the video player receives the video asset on line 12, together with the associated manifest.

After receipt of the video asset, the search engine 34 of the video player uses the asset manifest to search for the KeyID.

Initially, the video player 2 determines whether the KeyID is available in the generic content tag of a manifest file of the received asset, if this generic content protection tag is available. This is denoted by step 52 in FIG. 4.

If the generic content protection tag is not available, or if the KeyID is not found in it, then a search is conducted for a content protection tag for each of the supported technologies identified in the manifest file of the received asset. This is denoted by step 54 in FIG. 4.

If the KeyID is not located in any of those tags, it is determined if there is a PlayReady content protection tag associated with the received asset. PlayReady is a known DRM format. If there is a PlayReady content protection tag, it is searched in the PlayReadyObject Attribute of the PlayReady content protection tag containing the PlayReady header. The PlayReadyObject attribute is mandatory in a content protection attribute for PlayReady. This is denoted by step 56 in FIG. 4.

If there is no content protection attribute for PlayReady, but there is one for Marlin, the KeyID is searched in the (partial) Marlin header that is contained in the 'content protection' tag for Marlin. Marlin is a known DRM format. This is denoted by step 58 in FIG. 4.

If other DRM technologies are supported, then the search for the KeyID may be extended to those content protection tags as well. This is denoted by step 60 in FIG. 4.

Following this search process, the KeyID field in the manifest file associated with the received asset is located. This is denoted by step 62 in FIG. 4. If the KeyID field is not located following these searches, then the decryption of the received asset cannot be continued with.

Once the KeyID is located, a Widevine header can be created utilizing the Widevine header creation block 36 of FIG. 2, with the two fields KeyID and ContentID both populated. The creation of the Widevine header involves transferring the located KeyID field to a KeyID field of the created Widevine header as denoted by step 64 of FIG. 4, and a creating a ContentID field using the KeyID field as denoted by step 66 of FIG. 4. The syntax format of the created ContentID field will indicate that it is not a 'proper' ContentID field when it is subsequently parsed (as described below). The actual content of the KeyID field and the ContentID field of the created Widevine header will be the same, but the syntax of the two fields is different. The syntax used to create the ContentID field will be implementation dependent.

The video player 2 is thus modified in order to allow the Widevine header to be created based on the KeyID in the manifest file associated with the incoming asset.

The video player 2 then transmits on communication lines 14 a message to the Widevine license server 4.

The message is transmitted to a URL determined by the video player 2. The PlayReady header also contains the URL of a PlayReady license server. This URL can be used to derive the Widevine license server URL in the case the latter can be automatically derived from the former. For instance, assuming the URL of the PlayReady licenser server is http://Guard.piksel.com/playready and the URL of the Widevine licenser is http://Guard.piksel.com/widevine/, it is clear that the transformation can be easily achieved. When this is not the case, it is assumed that the video player knows the necessary URL. The Widevine header is thus transmitted to the license server in accordance with the URL. The License server URL is needed to engage the correct License Server, but it does not need to be included as part of the Widevine PSSH header.

The message to the Widevine license server is a Widevine license request consisting of an opaque binary object. The generation of this message from the video player to the Widevine license server, using the created Widevine header as denoted by step 68 in FIG. 4, is in accordance with the Widevine standard. This message may include the Widevine header plus additional information. However this message is in accordance with Widevine standard, and no modification is made to its format. The receipt of this message by the Widevine license server is indicated by step 72 of FIG. 5.

Figure 3:
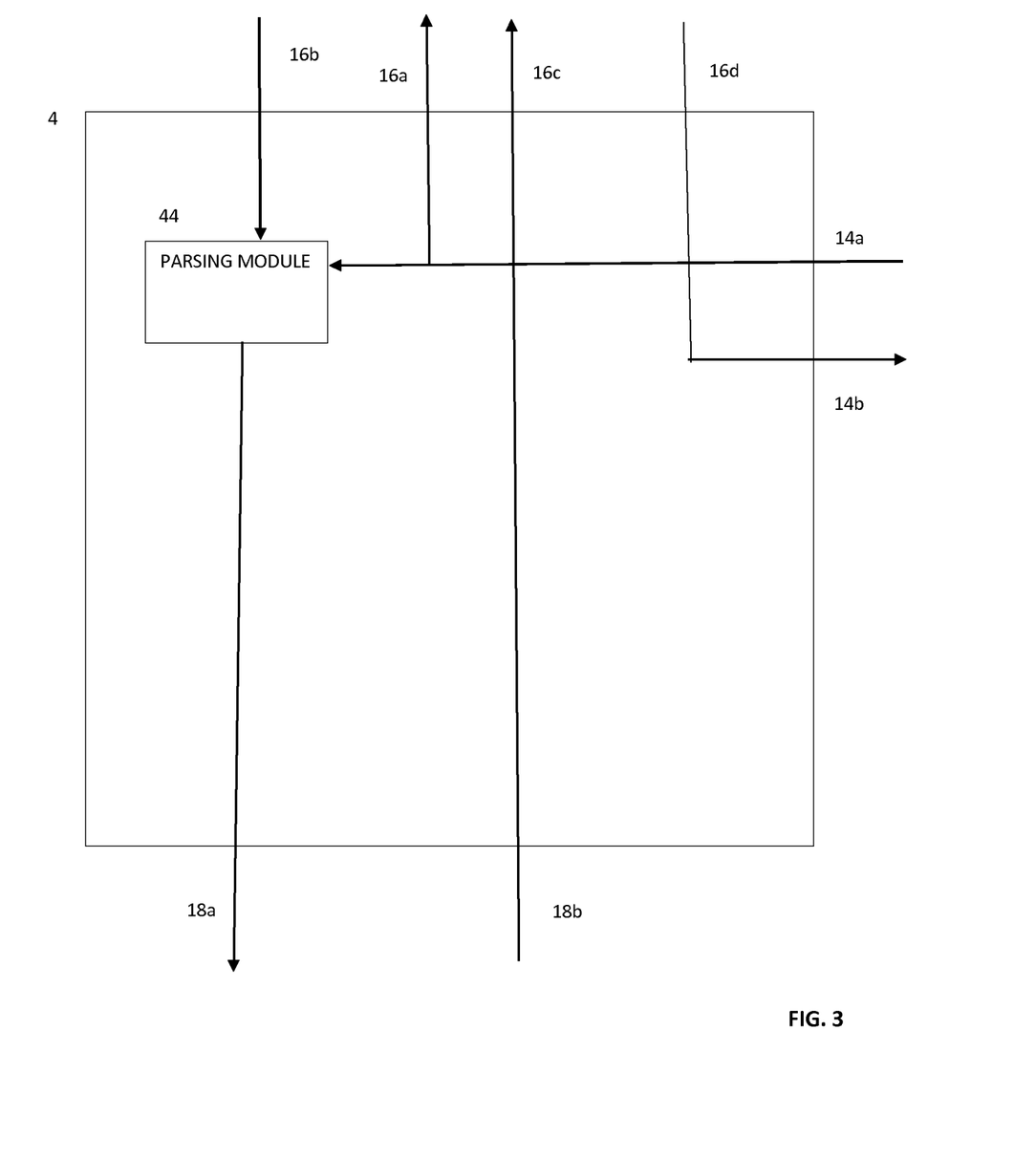
FIG. 3 illustrates an exemplary implementation of a license server in accordance with an example.

Because this message comprises an opaque object, the Widevine license server 4 cannot use it directly. Rather, the Widevine license server 4 has to call-up a further service provided by the Widevine cloud, which services are termed 'ParseOnly'. Thus the Widevine license server 4 communicates with the cloud 8 on communication lines 16, and transmits the message from the video player 2 on communication lines 14*a* to the cloud on communication lines 16*a* as shown in FIG. 3, to an appropriate address in the cloud for parsing. The address in the cloud 8 which the message is sent may be associated with Widevine cloud services, and in general is an address which provides parsing functionality associated with Widevine services and the Widevine protocol. This is illustrated by step 74 in FIG. 5.

The address in the cloud has the specific purpose to interpret the opaque object in accordance with the Widevine protocol, and return it—or part of it—back to the Widevine license server 4. The KeyID is not returned by the cloud to the Widevine license server 4.

A Widevine DRM server could also be implemented in a way that does not require Widevine cloud services. For example it could be implemented using a specific SDK (software development kit) provided by Widevine permitting local implementation of the functions that are provided by the Widevine cloud service at the Widevine license server 4. In this case, the Widevine cloud services are not engaged. However the parsing of the opaque object part of the Widevine license request received from the video player is still done by software provided by a Widevine service, and the information returned to the Widevine license server is the same.

In summary the Widevine license server 4 receives in the message on line 14 from the video player 2 an opaque binary object that includes the Widevine header plus additional data, which is sent to the cloud services for interpretation.

The dialog between the Widevine license server and the Widevine cloud services are based on a standard protocol defined by Widevine.

The Widevine cloud returns a message on line 16*b* to the Widevine license server, as denoted by step 76 in FIG. 5. This retuned message includes the ContentID field to the Widevine license server 4, but not the KeyID field.

This message is received by the parsing module 44 of the Widevine license server, and as denoted by step 78 the Widevine license server 4 parses the value of the ContentID field. It recognizes that its value is formatted according to a known syntax, meaning that it represents a KeyID instead of a 'proper' ContentID. Based on this, the license server extracts from the ContentID field the value of the KeyID that is embedded in it. This is denoted by step 80 in FIG. 5. This KeyID is then used to extract an encryption key.

The implementation of a Widevine license server 4 in this example separates two functions: the key management server (KMS) 22 and the license server itself. The KMS 22 is in charge to negotiate the encryption keys with the scramblers and to store those keys (actually a triplet <contentID, keyID, keySeed>) in the database of the key store 10. The Widevine license server is in charge to receive a license request from a video player, evaluate the requests and possibly return a DRM license back to the video player. As part of this process, the Widevine license server 4 gets from the KMS the keySeed corresponding to the KeyID field or ContentID field of interest.

The KMS 22 and the Widevine license server 4 are separate services that can be located in different network locations. As shown in FIG. 1 the license server and the KMS 22 are connected by communication lines 10.

The Widevine license server 4 thus uses the encryption key extracted from the KeyID field to extract key secrets from the key store 10 via the KMS 22, as denoted by the transmission of the message on line 18a in FIG. 3 and the receipt of a message on line 18b. This is also denoted by step 82 in FIG. 5.

The encryption secrets extracted from the key store 10 (keyID, contentID, keySeed) are then sent, together with default license properties, by the Widevine license server to a Widevine service (either locally available or offered by the Widevine Cloud Service via communication lines 16) in charge to create the actual Widevine license on line 16c. The latter is returned to the Widevine license server on communication lines 16d. This is denoted by step 84 in FIG. 5.

The Widevine license server 4 then returns the license on communication lines 14b to the video player, as denoted by step 86 of FIG. 5.

As denoted by step 70 in FIG. 5 the Widevine license is received by the video player, and used by the content decryption module 28 to provide a clean video signal on line 42 to the content visualisation module.

A specific example is the case of an asset being provided which comprises video content, which content is protected by PlayReady content protection technology. Only a PSSH header for PlayReady is available with the asset.

A client device (video player 2) receiving this asset is only provided with a Widevine encryption decoder, and therefore only supports the decryption of any asset which is protect with Widevine content protection technology.

As set out above, the video player is adapted to generate, on receipt of the asset, a Widevine PSSH header on-the-fly from the PlayReady PSSH header. The translation is on-the-fly in the sense that it is performed by the video player as and when it receives an HSS/PlayReady asset.

The PlayReady header contains, among other fields, the KeyID field. The PlayReady header does not contain a ContentID field. A Widevine PSSH header is required to include both a KeyID field and a ContentID field. Thus the generation of the Widevine header must take into account that a Widevine header must include these two mandatory fields: (i) the KeyID field which is the public part of the encryption secret; and (ii) the ContentID field which identifies the asset.

The Widevine header is created starting from information available in the PlayReady header. The KeyID field in the Widevine PSSH header is created by filling it with the value of a homonymous KeyID field extracted from the PlayReady PSSH header.

The ContentID field in the Widevine PSSH header created by filling it with a value obtained by the concatenation of a known string such as "KeyID=", and the value of the KeyID field extracted from the PlayReady PSSH header. Thus the ContentID field is filled with the value of the KeyID field, but following a specific syntax. The known syntax may be of the form: _KeyId=< . . . the keyID value . . . >. After this step both the KeyID field and the ContentID field created in a Widevine PSSH header contain the same information but in different formats.

The PlayReady PSSH header includes additional information fields, which additional information fields are not relevant for the described translation.

Other mandatory information that must be included in a Widevine PSSH header is created from the PlayReady PSSH header. This may be, for example: the name of the license (DRM) service provider; or the value of the flag specifying that the video is encrypted. This information is assumed to be known, and may be derived directly from the PlayReady PSSH Header and placed in the created Widevine PSSH header.

After the Widevine header is created, the video player transmits a message to a license server requesting the license for the video asset as described above.

Thus in a two step process: (i) the PlayReady PSSH header is translated into a Widevine PSSH header (according to the common encryption scheme); and (ii) the Widevine header that is required in the CENC file for triggering a request to a Widevine license server is generated by the video player using the information available in the PlayReady header.

The examples have the benefits that: (i) there is no need to change anything in the streaming server side; and (ii) there is no need to re-encode/re-encrypt any asset.

The technique is advantageously utilized to translate from HSS/PR to Dash/PR (CENC), but is not limited to this.

The specifications for HSS, MPEG-DASH and CENC are public.

As discussed above, the ContentID is returned by the cloud services to the license server, after the Widevine header is parsed. Because the Widevine header is encrypted according to the Widevine protocol, it is completely opaque to the Widevine license server in accordance with standard techniques. Therefore, the license server sends the header to the Widevine services in the cloud for interpretation. At this stage, the Widevine license server has not identified the header.

The Widevine cloud services only return the ContentID field to the DRM server after parsing. The Widevine license server parses the string representing the ContentID returned from the cloud services and, if it represents a KeyID instead of the ContentID, this is recognised by the Widevine license server.

As described above, the keySeed is then extracted from the encryption secrets database using the KeyID instead of the ContentID based on the identification.

The normal behavior of a Widevine license server would be to extract the encryption secrets by ContentID. However based on the returned parsed ContentID field, the Widevine license server recognizes that the format of this data in not in accordance with the standard format of a ContentID field, and further processes accordingly.

In summary, therefore, the following steps are implemented:

A header of a desired DRM system is constructed starting from the information in the available PSSH header.

The URL of the license server is either derived from the available information associated with the received asset or it is otherwise known to the video player.

The license server extracts an encryption secret either by KeyID or by ContentID, and this is used to access a key store to thereby obtain the necessary license.

As set out above it is possible to generate a Widevine header starting from the header of any other DRM technology. For instance, it is possible to generate a Widevine header starting from a Marlin header. The only requirement is that the DRM header input to this process contains the value of the KeyID. This is always the case for assets encrypted using the Common Encryption scheme.

This example describes how to interpret CENC/PlayReady encrypted content using Widevine. The same technique could be used to do the opposite, i.e. to interpret Widevine encrypted content using PlayReady. In general other combinations, based on the same principle, could be developed.

Whilst in general the opposite translation is possible, the header of other technologies may contain additional fields that cannot be readily derived from the Widevine header (e.g., PlayReady headers contains a field SystemID—an identifier identifying the content owner/OTT service known to Microsoft). In this case, the missing information must be available in the video player in advance.

Whilst the examples above discuss generating a Widevine header for an asset having content protection other than Widevine, and described the opposite translation, in general there may be provided a translation of a header for an asset having any content protection technology to a header of another content protection technology. In general this will be dependent upon there being at least one parameter which will need to be commonly provided in the original header and the translated header, such as the KeyID field for CENC protection schemes. In general, however, there is provided a technique which may be applied to create a header associated with one content protection technology from a header associated with another content protection technology.

The invention has been described by way of examples. The invention is not limited to any aspect of any example. The examples may be combined. Any part of any example may be combined with any part of any other example.

The invention claimed is:

1. A client device comprising a content protection decoder according to a Widevine standard, comprising:
   a receiver for receiving an asset including video content and an associated manifest file, wherein the asset is associated with content protection according to a further standard, the Widevine and the further standards being in accordance with a common standard but being different from each other;
   a search engine for identifying a KeyID field of the common standard associated with the received asset;
   a creation module stored in a memory of the client device and implemented by a processor, the creation module for creating a Widevine content protection header for the asset in accordance with the Widevine standard based on the KeyID field, the Widevine content protection header including a KeyID field corresponding to the identified KeyID field of the asset manifest file, and a ContentID field based on the identified KeyID field of the asset manifest file, wherein a format of the KeyID field and the created ContentID field of the created Widevine header are different;
   an interface for transmitting a request for a license to a Widevine license server and identifying the Widevine content protection header, and for receiving a Widevine license responsive to the request; and
   a controller for accessing the video content associated with the asset using the received Widevine license.

2. The client device of claim 1, wherein the search engine is configured to search for the KeyID field in a generic content tag of the manifest file of the received asset.

3. The client device of claim 1, wherein the search engine is configured to search for the KeyID field in a content protection tag of each supported content protection technology identified in the manifest file of the received asset.

4. The client device of claim 1, wherein the device is configured to determine if there is a PlayReady content protection tag associated with the received asset, and in dependence thereon search for the parameter in a PlayReadyObject Attribute of the PlayReady content protection tag containing a PlayReady header.

5. The client device of claim 1, wherein the device is configured to determine if there is a Marlin content protection tag associated with the received asset, and in dependence thereon search for the parameter in a Marlin header that is contained in the content protection tag for Marlin.

6. A license server configured to generate a license in a Widevine license server by:
   receiving a license request from a client device, the license request comprising a ContentID field associated with a Widevine standard;
   transmitting the license request to a processing function associated with the Widevine standard;
   receiving the ContentID field associated with the Widevine standard from the processing function;
   parsing the ContentID field, and in dependence on identification of the syntax of the ContentID field, using a KeyID field to access a Widevine license; and
   transmitting the Widevine license to the client device.

7. A method of generating a license request in accordance with a Widevine standard in a client device, comprising:
   receiving an asset including video content and an associated manifest file, wherein the asset is associated with content protection according to a further standard, the Widevine and the further standards being in accordance with a common standard but being different to each other;
   identifying a KeyID field of the common standard associated with the received asset;
   creating a content protection header for the asset in accordance with the Widevine standard based on the KeyID field, comprising creating a Widevine header including a KeyID field corresponding to the identified KeyID field of the asset manifest file, and a ContentID field based on the identified KeyID field of the asset manifest file, wherein the format of the KeyID field and the created ContentID field of the created Widevine header are different;
   transmitting a request for a license to a Widevine license server including the created Widevine content protection header;
   receiving a Widevine license responsive to the request; and
   accessing the video content associated with the asset using the received Widevine license.

8. A computer program embodied on a non-transitory computer-readable medium which, when executed on a computer device, performs the method of claim 7.

9. A method of generating a license in a Widevine license server, comprising:
   receiving a license request from a client device, the license request comprising a Content ID field associated with a Widevine standard;
   transmitting the license request to a processing function associated with the Widevine standard;
   receiving the Content ID field associated with the Widevine standard from the processing function;
   parsing the Content ID field, and in dependence on identification of the syntax of the Content ID field, using a KeyID field to access a Widevine license; and
   transmitting the Widevine license to the client device.

10. A computer program product for storing a computer program on a non-transitory computer-readable medium, which when executed on a computer device, performs the method of claim 9.

11. The method of claim 9, wherein the identification of the syntax of the parameter comprises recognising the syntax of the parameter to not be in accordance with a standard syntax of the parameter.

12. The method of claim 11, wherein the identification of the syntax of the parameter further comprises positively identifying the syntax of the parameter.

13. A license delivery system comprising:
the license server of claim 6; and
a client device comprising a content protection decoder according to the Widevine standard, the client device comprising:
a receiver for receiving an asset and an associated manifest file, wherein the asset is associated with content protection according to a further standard, the Widevine and the further standards being in accordance with a common standard but being different from each other;
a search engine for identifying the KeyID field of the common standard associated with the received asset;
a creation module stored in a memory of the client device and implemented by a processor, the creation module for creating a content protection header for the asset in accordance with the Widevine standard based on the KeyID field, a Widevine content protection header including the KeyID field corresponding to the identified KeyID field of the asset manifest file, and the ContentID field based on the identified KeyID field of the asset manifest file, wherein a format of the KeyID field and the created ContentID field of the created Widevine header are different;
an interface for transmitting a request for the Widevine license to the Widevine license server including the created Widevine content protection header, and for receiving the Widevine license responsive to the request; and
a controller for accessing the content associated with the asset using the Widevine license.

* * * * *